United States Patent
Funakoshi et al.

(10) Patent No.: US 6,448,365 B1
(45) Date of Patent: Sep. 10, 2002

(54) AROMATIC POLYCARBONATE COMPOSITION

(75) Inventors: Wataru Funakoshi; Masumi Hirata; Hiroaki Kaneko; Yuichi Kageyama; Toru Sawaki; Katsushi Sasaki, all of Iwakuni (JP)

(73) Assignee: Teijin Limited, Tokyo (JP)

( * ) Notice: Subject to any disclaimer, the term of this patent is extended or adjusted under 35 U.S.C. 154(b) by 0 days.

(21) Appl. No.: 09/959,830

(22) PCT Filed: Aug. 24, 2000

(86) PCT No.: PCT/JP00/05701

§ 371 (c)(1),
(2), (4) Date: Nov. 8, 2001

(87) PCT Pub. No.: WO01/70883

PCT Pub. Date: Sep. 27, 2001

(30) Foreign Application Priority Data

Mar. 22, 2000 (JP) .................................. PCT/JP00/01745

(51) Int. Cl.⁷ .............................................. C08G 64/00
(52) U.S. Cl. ........................... 528/196; 428/64; 428/66; 528/198
(58) Field of Search ................................ 528/196, 198; 428/64, 66

(56) References Cited

U.S. PATENT DOCUMENTS 5,696,222 A    12/1997  Kaneko et al.
6,221,556 B1 * 4/2001  Gallucci et al. ........... 428/64.7

FOREIGN PATENT DOCUMENTS

| EP | 0 435 124 A | 7/1991 |
|---|---|---|
| EP | 435124 | 7/1991 |
| JP | 04-036346 A | 2/1992 |
| JP | 04-328124 A | 11/1992 |
| JP | 04-328156 A | 11/1992 |
| JP | 6-92529 | 4/1994 |
| JP | 07-268091 A | 10/1995 |
| JP | 08-059975 A | 3/1996 |
| JP | 11-100497 A | 4/1999 |
| JP | 11-100497 | 4/1999 |
| JP | 2000-129112 A | 5/2000 |
| JP | 2000-129112 | 5/2000 |

OTHER PUBLICATIONS

Patent Abstracts of Japan, JP–A–04–328124, date Nov. 17, 1992.
Patent Abstracts of Japan, JP–A–04–328156, date Nov. 17, 1992.
Patent Abstracts of Japan, JP–A–08–059975, date Mar. 5, 1996.
Patent Abstracts of Japan, JP–A–04–036346, date Feb. 6, 1992.
Patent Abstracts of Japan, JP–A–07–268091, date Oct. 17, 1995.
Patent Abstracts of Japan, JP–A–2000–129112, date May 9, 2000.
Patent Abstracts of Japan, JP–A–11–100497, date Apr. 13, 1999.

* cited by examiner

Primary Examiner—Terressa M. Boykin
(74) Attorney, Agent, or Firm—Sughrue Mion, PLLC

(57) ABSTRACT

An aromatic polycarbonate composition which contains 0.05 to 65 ppm of bonded phosphorus atoms to polycarbonate chains and free phosphorus compounds consisting of a tervalent phosphorus compound and a pentavalent phosphorus compound in a specific ratio. It is excellent in transparency, color stability and residence stability at the time of molding and is suitably used in disk substrates.

23 Claims, No Drawings

AROMATIC POLYCARBONATE COMPOSITION

FIELD OF THE INVENTION

The present invention relates to an aromatic polycarbonate composition and to an injection molded product thereof. More specifically, it relates to an aromatic polycarbonate composition having excellent transparency, color stability and residence stability during molding and to an injection molded product thereof.

PRIOR ART

A polycarbonate resin is excellent in optical properties, electric properties and dimensional stability, and has self-extinguishing properties and excellent mechanical properties such as impact resistance and rupture strength, as well as excellent heat resistance and transparency. Therefore, it is used for various purposes in large quantities. Making use of its transparency in particular, it is used in lenses, prisms, optical disks, sheets, films and the like in great quantities.

Particularly for optical resin applications such as lenses and optical disks, excellent transparency and color are required of molded products. Stated more specifically, residence stability during the molding of a resin composition, particularly thermal stability and color stability during residence, further moldability at the time of molding, that is, transferability and releasability which give precision molded products having a designed shape and size and further environmental stability such as wet heat durability are required of molded products.

To produce a molded product of a polycarbonate resin composition, a fatty acid ester-based releasing agent has been used advantageously. This releasing agent is very effective in improving releasability between a metal mold and a molded product when a precision molded product such as a disk is molded and suppresses reductions in the physical properties such as color, transparency and surface properties of a molded product. However, the fatty acid ester-based compound is characterized that it has low heat resistance and is readily thermally decomposed though it has relatively high releasability.

Particularly, a fatty acid ester-based releasing agent involves such a problem that it decomposes at a molding temperature of a polycarbonate resin, particularly a temperature higher than 340° C., in the presence of an acidic or basic compound or metal compound, thereby reducing its releasability or causing the color development of a molded product in an extreme case to contaminate a metal mold.

There are known methods of producing a polycarbonate resin: one in which phosgene is directly reacted with an aromatic dihydroxy compound (interfacial polymerization method) and one in which an ester exchange reaction between an aromatic dihydroxy compound and a diaryl carbonate such as diphenyl carbonate is carried out in a molten state (melting method).

To solve the above problem, the interfacial polymerization method succeeded in reducing impurities contained in a polycarbonate resin by making purification treatments on the resin and suppressing the decomposition of the above releasing agent by using stabilizers to a certain extent.

However, due to the recent appearance of a new standard-based DVD disk, a substrate must be molded at a high temperature of 350° C. or higher than that of the prior art and the decomposition and color development of the releasing agent or the resin composition at the time of forming the substrate are becoming new problems to be solved.

In the melting method for producing a polycarbonate through an ester exchange reaction, general ester exchange catalysts are used as disclosed by literature such as "Polycarbonate of Plastic Material Lecture 17", pp. 48–53 to improve production efficiency. It can be said that a catalyst system in which a nitrogen-containing basic compound or a phosphorus-containing basic compound and an alkali metal compound are used in combination out of the ester exchange catalysts is preferred because it improves the productivity and color of a polycarbonate resin, suppresses the formation of a branched structure in the polymer molecule, has excellent quality such as flowability and rarely forms foreign matter such as a gel.

However, a polycarbonate resin produced by the melt polymerization method is unsatisfactory in terms of stability under a high-temperature or oxidative atmosphere or hydrolytic conditions due to its secondary reactivity derived from an alkali metal compound used as an ester exchange catalyst or additives. In addition, a releasing agent added as a precision molding aid cannot exhibit its own capability very often compared with a polycarbonate resin produced by the interfacial polymerization method or its resin composition because the releasing agent causes the above decomposition or the like.

To solve these problems, JP-A 4-328124 and JP-A 4-328156 (the term "JP-A" as used herein means an "unexamined published Japanese patent application") propose a method of neutralizing an ester exchange catalyst with an acidic compound containing a sulfonic acid ester.

JP-A 8-59975 proposes use of a combination of a sulfonic acid phosphonium salt and a phosphorous acid ester-based compound or phenol-based antioxidant.

Further, JP-A 4-36346 discloses an aromatic polycarbonate-based resin composition which contains 100 parts by weight of an aromatic polycarbonate resin produced through an ester exchange reaction in a molten state between an aromatic organic dihydroxy compound and a carbonic acid diester in the presence of a catalytic system containing a nitrogen-containing basic compound (a) and an alkali metal compound or alkali earth metal compound (b), or a catalytic system containing (a), (b) and boric acid or boric acid ester and 0.005 to 0.5 part by weight of a phosphorus-based antioxidant.

When a precision molded product is to be produced from the above polycarbonate resin produced by the melt polymerization method using a fatty acid ester-based releasing agent, the releasing agent causes a secondary reaction such as decomposition and cannot exhibit expected parting performance to the full, thereby causing frequently such problems as the deformation of a molded product, further the color development of the molded product and the great contamination of the surface of the metal mold of a molding machine. Particularly, this tendency is marked under a high-temperature condition which is required for the molding of a DVD substrate. The above defects are very serious because they cause a transfer failure such as a groove or pit at the time of forming a precision molded product such as an optical disk.

SUMMARY OF THE INVENTION

It is an object of the present invention to provide an aromatic polycarbonate composition having excellent stability at the time of melt molding.

It is another object of the present invention to provide an aromatic polycarbonate composition which has excellent stability at the time of melt molding and suppresses decomposition and color development, a reduction in its molecular weight and the formation of black foreign matter at the time of melt molding.

It is still another object of the present invention to provide an aromatic polycarbonate composition which rarely contaminates a metal mold during molding and has excellent releasability from the metal mold.

It is a further object of the present invention to provide an aromatic polycarbonate composition which is suitable for precision molding and has excellent molding efficiency.

It is a still further object of the present invention to provide a molded product, particularly an injection molded product of the aromatic polycarbonate composition of the present invention.

Other objects and advantages of the present invention will become apparent from the following description.

According to the present invention, firstly, the above objects and advantages of the present invention are attained by an aromatic polycarbonate composition comprising:

(A) 100 parts by weight of an aromatic polycarbonate
   (1) which comprises mainly a recurring unit represented by the following formula (1):

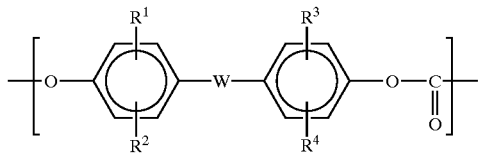

wherein $R^1$, $R^2$, $R^3$ and $R^4$ are each independently a hydrogen atom, alkyl group having 1 to 10 carbon atoms, aryl group having 6 to 10 carbon atoms or aralkyl group having 7 to 10 carbon atoms, and W is an alkylene group having 1 to 10 carbon atoms, alkylidene group having 2 to 10 carbon atoms, cycloalkylene group having 6 to 10 carbon atoms, cycloalkylidene group having 6 to 10 carbon atoms, alkylene-arylene-alkylene group having 8 to 15 carbon atoms, oxygen atom, sulfur atom, sulfoxide group or sulfone group,
   (2) which has a viscosity average molecular weight of 12,000 to 100,000,
   (3) which has a molecular terminal OH group concentration of 3 to 80 equivalents/ton of a polycarbonate resin (to be referred to as "eq/ton" hereinafter), and
   (4) which contains bonded phosphorus atoms, which is phosphorus atoms bonded to a polycarbonate chain, in an amount of 0.05 to 65 ppm; and (B) a combination of free P(III) compound and free P(V) compound of which proportion satisfies the following expression:

$$0.1 \leq P(V) \leq 3 \times P(III)^{0.7} + 2 \times (OH)^{0.2}$$

wherein P(V) is the weight-based content (ppm) of the P(V) compound in terms of phosphorus atoms, P(III) is the weight-based content (ppm) of the P(III) compound in terms of phosphorus atoms, and OH is the concentration (eq/ton) of molecular terminal OH groups, and which total $5 \times 10^{-6}$ to $6.5 \times 10^{-2}$ parts by weight in terms of phosphorus atoms; and
   having (C) a melt viscosity change rate at 300° C. of 0.5% or less.

Secondly, the above objects and advantages of the present invention can be attained by the above aromatic polycarbonate composition of the present invention.

In the present invention, the expression "bonded phosphorus atom" means a phosphorus atom bonded to a polycarbonate chain and the expression "free phosphorus atom" means a phosphorus atom which is not bonded to the polycarbonate chain.

DETAILED DESCRIPTION OF THE EMBODIMENT OF THE INVENTION

The aromatic polycarbonate used in the present invention essentially consists of a recurring unit represented by the following formula (1):

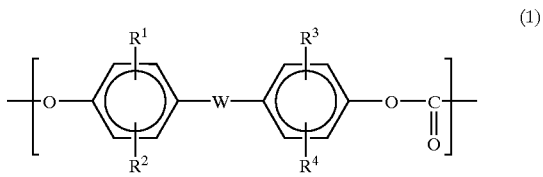

wherein $R^1$, $R^2$, $R^3$ and $R^4$ are each independently a hydrogen atom, alkyl group having 1 to 10 carbon atoms, aryl group having 6 to 10 carbon atoms or aralkyl group having 7 to 10 carbon atoms, and W is an alkylene group having 1 to 10 carbon atoms, alkylidene group having 2 to 10 carbon atoms, cycloalkylene group having 6 to 10 carbon atoms, cycloalkylidene group having 6 to 10 carbon atoms, alkylene-arylene-alkylene group having 8 to 15 carbon atoms, oxygen atom, sulfur atom, sulfoxide group or sulfone group.

$R^1$, $R^2$, $R^3$ and $R^4$ in the above formula (1) are each independently an atom or group as defined hereinabove.

The alkyl group having 1 to 10 carbon atoms may be linear or branched, as exemplified by methyl, ethyl, propyl, butyl, octyl, decyl and the like. Examples of the aryl group having 6 to 10 carbon atoms include phenyl, tolyl, cumyl, naphthyl and the like. Examples of the aralkyl group having 7 to 10 carbon atoms include benzyl, 2-phenethyl, 2-(2-methylphenyl)ethyl and the like.

$R^1$, $R^2$, $R^3$ and $R^4$ are each independently and preferably a hydrogen atom, methyl group or t-butyl group, particularly preferably hydrogen atom.

W is as defined hereinabove.

The alkylene group having 1 to 10 carbon atoms may be linear or branched, as exemplified by methylene, 1,2-ethylene, 1,2-propylene, 1,2-butylene, 1,10-decylene and the like.

Examples of the alkylidene group having 2 to 10 carbon atoms include ethylidene, propylidene, butylidene, hexylidene and the like.

Examples of the cycloalkylene group having 6 to 10 carbon atoms include 1,4-cyclohexylene, 2-isopropyl-1,4-cyclohexylene and the like.

Examples of the cycloalkylidene group having 6 to 10 carbon atoms include cyclohexylidene, isopropylcyclohexylidene and the like.

Examples of the alkylene-arylene-alkylene group having 8 to 15 carbon atoms include an m-diisopropylphenylene group and the like.

W is preferably a cyclohexylidene group or 2,2-propylidene group, particularly preferably 2,2-propylidene group.

The aromatic polycarbonate contains the recurring unit represented by the above formula (1) in an amount of 50 molt or more, preferably 70 mol % or more, particularly preferably 80 molt or more based on the total of all the recurring units. One having ordinary skill in the art will understand recurring units which may be contained other than the above recurring unit represented by the above formula (1) from the following description.

The aromatic polycarbonate used in the present invention has a viscosity average molecular weight of 12,000 to 100,000, preferably 13,000 to 100,000, more preferably 13,000 to 70,000.

The aromatic polycarbonate used in the present invention has a molecular terminal OH group concentration of 3 to 80 eq/ton, preferably 5 to 70 eq/ton, more preferably 10 to 50 eq/ton.

The aromatic polycarbonate used in the present invention further contains bonded phosphorus atoms, that is, phosphorus atoms bonded to a polycarbonate chain, in an amount of 0.05 to 65 ppm (based on weight), preferably 0.05 to 50 ppm, more preferably 0.05 to 30 ppm.

The above aromatic polycarbonate used in the present invention preferably has an acid value of 0 to 2 eq/ton. The ratio (Mw/Mn) of weight average molecular weight (Mw) to number average molecular weight (Mn) is preferably 2.0 to 3.6, more preferably 2.2 to 3.4.

The aromatic polycarbonate used in the present invention may be preferably produced from an aromatic dihydroxy compound and a carbonate bond forming compound by conventionally known methods such as interfacial polymerization using phosgene, melt polymerization and solid-phase polymerization.

The aromatic dihydroxy compound is preferably a compound represented by the following formula (2):

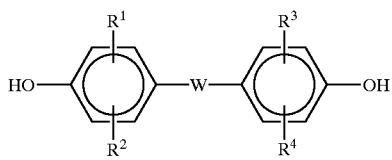

(2)

wherein $R^1$, $R^2$, $R^3$, $R^4$ and W are as defined in the above formula (1).

Illustrative examples of the aromatic dihydroxy compound (2) include bis(4-hydroxyaryl)alkanes such as bis(4-hydroxyphenyl)methane, 2,2-bis(4-hydroxyphenyl)propane, 1,1-bis(4-hydroxyphenyl)ethane, 2,2-bis(4-hydroxy-3-methylphenyl)propane, 2,2-bis(4-hydroxyphenyl)heptane, 2,2-bis(4-hydroxy-3,5-dichlorophenyl)propane, bis(4-hydroxyphenyl)phenylmethane, 4,4'-dihydroxyphenyl-1,1'-m-diisopropylbenzene and 4,4'-dihydroxyphenyl-9,9-fluorene; bis(hydroxyaryl)cycloalkanes such as 1,1-bis(4-hydroxyphenyl)cyclopentane, 1,1-bis(4-hydroxyphenyl)cyclohexane, 1-methyl-1-(4-hydroxyphenyl)-4-(dimethyl-4-hydroxyphenyl)methyl-cyclohexane, 4-[1-[3-(4-hydroxyphenyl)-4-methylcyclohexyl]-1-methylethyl]phenol, 4,4'-[1-methyl-4-(1-methylethyl)-1,3-cyclohexanediyl]bisphenol and 2,2,2',2'-tetrahydro-3,3,3',3'-tetramethyl-1,1'-spirobis-[1H-indene]-6,6'-diol; dihydroxyaryl ethers such as bis( 4-hydroxyphenyl)ether, bis(4-hydroxy-3,5-dichlorophenyl)ether and 4,4'-dihydroxy-3,3'-dimethylphenyl ether; dihydroxydiaryl sulfides such as 4,4'-dihydroxydiphenyl sulfide and 4,4'-dihydroxy-3,3'-dimethyldiphenyl sulfide; dihydroxydiaryl sulfoxides such as 4,4'-dihydroxydiphenyl sulfoxide and 4,4'-dihydroxy-3,3'-dimethyldiphenyl sulfoxide; dihydroxydiaryl sulfones such as 4,4'-dihydroxydiphenyl sulfone and 4,4'-dihydroxy-3,3'-dimethyldiphenyl sulfone; dihydroxydiaryl isatins such as 4,4'-dihydroxydiphenyl-3,3'-isatin; dihydroxydiaryl xanthenes such as 3,6-dihydroxy-9,9-dimethyl xanthene; dihydroxybenzenes such as resorcin, 5-methylresorcin, 5-ethylresorcin, 5-t-butylresorcin, 5-phenylresorcin, 5-cumylresorcin, hydroquinone, 2-methylhydroquinone, 2-ethylhydroquinone, 2-t-butylhydroquinone, 2-phenylhydroquinone and 2-cumylhydroquinone; and dihydroxydiphenyls such as 4,4'-dihydroxydiphenyl and 3,3'-dichloro-4,4'-dihydroxydiphenyl.

Out of these, 2,2-bis(4-hydroxyphenyl)propane is preferred because it has stability as a monomer and a small content of impurities therein and can be acquired easily.

In the present invention, at least one monomer may be optionally contained in the molecule of the aromatic polycarbonate to control glass transition temperature, improve flowability or control optical properties such as an increase in refractive index or a reduction in birefringence.

Illustrative examples of the monomer include aliphatic dihydroxy compounds such as ethylene glycol, 1,4-butanediol, 1,4-cyclohexane dimethanol, 2,2-dimethyl-1,3-propanediol, 1,10-decanediol, diethylene glycol, polyethylene glycol and polytetramethylene glycol; dicarboxylic acids such as succinic acid, isophthalic acid, 2,6-naphthalenedicarboxylic acid, adipic acid, cyclohexanedicarboxylic acid and terephthalic acid; and oxyacids such as p-hydroxybenzoic acid, 6-hydroxy-2-naphthoic acid and lactic acid.

A carbonyl halide such as phosgene or haloformate compound is used as the carbonate bond forming compound in the phosgene method.

An aromatic carbonic acid ester such as diphenyl carbonate, ditolyl carbonate, bis(2-chlorophenyl)carbonate or m-cresyl carbonate is used as the carbonate bond forming compound in the melt polymerization method. Also, dimethyl carbonate, dibutyl carbonate or dicyclohexyl carbonate may be used as desired.

Out of these, diphenyl carbonate is particularly preferred from the viewpoints of reactivity, stability against the color development of the obtained resin and costs.

In the solid-phase polymerization method, an aromatic carbonate oligomer having a small molecular weight produced by the phosgene method or melt polymerization method is crystallized and polymerized in a solid state at a high temperature and optionally at a reduced pressure to produce an aromatic polycarbonate having a recurring unit structure represented by the formula (1).

In the above aromatic polycarbonate production method, an aromatic polyester carbonate can be produced by using a dicarboxylic acid or a dicarboxylic acid derivative such as a dicarboxylic acid halide or dicarboxylic acid ester in conjunction with phosgene or carbonic acid diester. This aromatic polyester carbonate may be used as the aromatic polycarbonate in the present invention.

Illustrative examples of the dicarboxylic acid or dicarboxylic acid derivative include aromatic dicarboxylic acids such as terephthalic acid, isophthalic acid, terephthalic acid chloride, isophthalic acid chloride, diphenyl terephthalate and diphenyl isophthalate; aliphatic dicarboxylic acids such as succinic acid, glutaric acid, adipic acid, suberic acid, azelaic acid, sebacic acid, 1,10-decanedicarboxylic acid, 1,12-dodecanedicarboxylic acid, adipic acid chloride, suberic acid chloride, azelaic acid chloride, sebacic acid chloride, diphenyl azelate, diphenyl sebacate, diphenyl 1,10-decanedicarboxylate diphenyl 1,12-dodecanedicarboxylate; and alicyclic dicarboxylic acids such as cyclopropanedicarboxylic acid, 1,3-cyclobutanedicarboxylic acid, 1,3-cyclopentanedicarboxylic acid, 1,3-cyclohexanedicarboxylic acid, 1,4-cyclohexanedicarboxylic acid; cyclopropanedicarboxylic acid chloride, 1,3- cyclobutanedicarboxylic acid chloride, 1,3-cyclopentanedicarboxylic acid chloride, 1,3-cyclohexanedicarboxylic acid chloride, 1,4-cyclohexanedicarboxylic acid chloride; diphenyl cyclopropane dicarboxylate, diphenyl 1,3-cyclobutane dicarboxylate, diphenyl 1,3-cyclopentane dicarboxylate, diphenyl 1,3-cyclohexane dicarboxylate and diphenyl 1,4-cyclohexane dicarboxylate.

To produce the aromatic polycarbonate having the recurring unit structure represented by the above formula (1), a polyfunctional compound having three or more functional groups in one molecular may be used in conjunction with the above dihydroxy compound. The polyfunctional compound is preferably a compound having a phenolic hydroxyl group or carboxyl group.

Illustrative examples of the polyfunctional compound include 1,1,1-tris(4-hydroxyphenyl)ethane, 2,2',2"-tris(4-hydroxyphenyl)-m-diisopropylbenzene, 2,2',2"-tris(4-hydroxyphenyl)-p-diisopropylbenzene, α-methyl-α,α',α'-tris(4-hydroxyphenyl)-1,4-diethylbenzene, α,α',α'-tris(4-hydroxyphenyl)- 1,3,5-triisopropylbenzene, phloroglucin, 4,6-dimethyl-2,4,6-tris(4-hydroxyphenyl)-heptane, 1,3,5-tris(4-hydroxyphenyl)benzene, 2,2-bis[4,4-(4-hydroxyphenyl)-cyclohexyl]-propane, trimellitic acid, 1,3, 5-tricarboxybenzene, pyromellitic acid and the like.

Out of these, 1,1,1-tris(4-hydroxyphenyl)ethane and α,α', α'-tris(4-hydroxyphenyl)-1,3,5-triisopropylbenzene are preferred.

When a polyfunctional compound is used in combination, it is used in an amount of 0.03 mol or less, preferably 0.00005 to 0.02 mol, more preferably 0.0001 to 0.01 mol based on 1 mol of the aromatic dihydroxy compound to improve the melt viscosity of the polycarbonate.

In the present invention, the above aromatic polycarbonate has a molecular terminal OH group concentration of 3 to 80 eq/ton. The terminals of the molecule of an aromatic polycarbonate produced by the phosgene method are capped by a monofunctional compound added as a molecular weight modifier to produce an aromatic polycarbonate having a molecular terminal OH group concentration of 3 to 20 eq/ton with ease. However, in the melt polymerization method or solid-phase polymerization method, the concentration of molecular terminal OH groups must be reduced positively.

The concentration of molecular terminal OH groups is preferably 3 to 70 eq/ton, more preferably 3 to 60 eq/ton.

The concentration of molecular terminal OH groups can be controlled to the above range easily by using a terminal capping agent as a molecular weight modifier in the phosgene method. In the melt polymerization or solid-phase polymerization method in which a terminal hydroxyl group is formed in large quantities by a reaction process, a special measure must be taken to reduce the concentration of terminal OH groups. For example, this can be attained by the following conventionally known methods.

1) method of controlling the molar ratio of charge stocks; The molar ratio of a carbonate bond forming compound to an aromatic dihydroxy compound is increased at the time of charging for a polymerization reaction. For example, this molar ratio is set to a range of 1.03 to 1.10 in consideration of the characteristic features of a polymerization reactor. Alternatively, 2) terminal capping method; At the end of a polymerization reaction, terminal OH groups are capped with a salicylic acid ester-based compound in accordance with a method disclosed by U.S. Pat. No. 5,696,222. The amount of the salicylic acid ester-based compound is preferably 0.8 to 10 mols, more preferably 0.8 to 5 mols, particularly preferably 0.9 to 2 mols based on 1 chemical equivalent of the terminal hydroxyl group before a capping reaction. By adding the salicylic acid ester-based compound in that ratio, 80% or more of the terminal hydroxyl groups can be capped advantageously. To carry out this capping reaction, catalysts enumerated in the description of the above patent are preferably used.

Illustrative examples of the salicylic acid ester-based compound include 2-methoxycarbonylphenylaryl carbonates such as 2-methoxycarbonylphenyl-phenylcarbonate, 2-methoxycarbonylphenyl-4'-hexadecylphenyl carbonate, 2-methoxycarbonylphenyl-cyclohexylphenyl carbonate, 2-methoxycarbonylphenyl-cumylphenyl carbonate and di(2-methoxycarbonylphenyl)carbonate; 2-methoxycarbonylphenyl-alkyl carbonates such as 2-methoxycarbonylphenyl-cetyl carbonate and 2-methxoycarbonylphenyl-2'-(o-methoxycarbonylphenyl) oxycarbonylethyl carbonate; 2-ethoxycarbonylphenyl-aryl carbonates such as 2-ethoxycarbonylpheny-phenyl carbonate and di(2-ethoxycarbonylphenyl)carbonate; 2-ethoxycarbonylphenylalkyl carbonates such as 2-ethoxycarbonylphenyl-methyl carbonate; (2'-methoxycarbonylphenyl)esters of aromatic carboxylic acids such as (2-methoxycarbonylphenyl)benzoate and (2'-methoxycarbonylphenyl) 4-(o-ethoxycarbonylphenyl) oxycarbonyl benzoate; (2'-ethoxycarbonylphenyl)esters of aromatic carboxylic acids such as (2-ethoxycarbonylphenyl) benzoate; and aliphatic carboxylic acid esters such as (2-methoxycarbonylphenyl)stearate and bis(2-methoxycarbonylphenyl)succinate.

In the method of producing an aromatic polycarbonate essentially consisting of a recurring unit represented by the above formula (1), a tertiary amine, quaternary ammonium salt, tertiary phosphine, quaternary phosphonium salt, nitrogen-containing heterocyclic compound or salt thereof, iminoether or salt thereof, or a compound having an amide group is used as a catalyst in the above phosgene method.

Since a large amount of an alkali metal compound or an alkali earth metal compound is used as an agent for trapping a hydrogen halide such as hydrochloric acid formed during a reaction in this phosgene method, it is preferred to carry out washing and purification thoroughly so as to prevent the above impurity from remaining in a polymer after production.

In the melt polymerization and solid-phase polymerization methods, an ester exchange catalyst containing an alkali metal compound or an alkali earth metal compound is preferably used. The alkali metal compound or alkali earth metal compound used as the catalyst is used in an amount of $1{\cdot}10^{-8}$ to $1\times10^{-6}$ equivalent in terms of an elemental metal based on 1 mol of the aromatic dihydroxy compound. Above or below the above range, the alkali metal compound or alkali earth metal compound may exert a bad influence upon the physical properties of the obtained aromatic polycarbonate, an ester exchange reaction may not proceed fully, and an aromatic polycarbonate having a high molecular weight may not be obtained disadvantageously. An alkali metal compound is preferred as the ester exchange catalyst.

When an alkali metal or alkali earth metal derived from the ester exchange catalyst contained in the aromatic polycarbonate is used in the above range, the production of the aromatic polycarbonate can be carried out efficiently at a high yield, and the physical properties of the obtained aromatic polycarbonate become preferred to attain the object of the present invention.

The alkali metal compound used as the ester exchange catalyst is, for example, a hydroxide, hydrocarbon compound, carbonate, acetate, nitrate, nitrite, sulfite, cyanate, thiocyanate, stearate, borohydride, benzoate, hydrogenphosphate, bisphenol or phenol salt of an alkali metal.

Illustrative examples of the alkali metal compound include sodium hydroxide, lithium hydroxide, sodium bicarbonate, potassium bicarbonate, sodium carbonate, cesium carbonate, sodium acetate, lithium acetate, rubidium nitrate, sodium nitrite, lithium nitrite, sodium sulfite, sodium cyanate, potassium cyanate, lithium cyanate, sodium thiocyanate, potassium thiocyanate, cesium thiocyanate, sodium stearate, sodium borohydride, potassium borohydride, lithium borohydride, sodium tetraphenylborate, sodium benzoate, lithium benzoate, disodium hydrogenphosphate, salts of bisphenol A such as disodium salts, dilithium salts, monosodium salts, monopotassium salts, sodium potassium salts or sodium lithium salts of bisphenol A and sodium phenolate, or lithium phenolate.

A basic nitrogen compound and/or basic phosphorus compound are/is preferably used in combination as an ester exchange catalyst.

Illustrative examples of the basic nitrogen compound include ammonium hydroxides having an alkyl, aryl or alkylaryl group such as tetramethyl ammonium hydroxide ($Me_4NOH$), tetraethyl ammonium hydroxide ($Et_4NOH$), tetrabutyl ammonium hydroxide ($Bu_4NOH$), benzyltrimethyl ammonium hydroxide ($Ph-CH_2(Me)_3NOH$) and hexadecyltrimethyl ammonium hydroxide; basic ammonium salts having alkyl, arylalkyl or alkylaryl group such as tetramethyl ammonium acetate, tetraethyl ammonium phenoxide, tetrabutyl ammonium carbonate, benzyltrimethyl ammonium benzoate and hexadecyltrimethyl ammonium ethoxide; tertiary amines such as triethylamine, tributylamine, dimethylbenzylamine and hexadecyl dimethylamine; and basic salts such as tetramethyl ammonium borohydride ($Me_4NBH_4$), tetrabutyl ammonium borohydride ($BU_4NBH_4$), tetrabutyl ammonium tetraphenyl borate ($BU_4NBPh_4$) and tetramethyl ammonium tetraphenyl borate ($Me_4NBPh_4$).

Illustrative examples of the basic phosphorus compound include phosphonium hydroxides having an alkyl, aryl or alkylaryl group such as tetramethyl phosphonium hydroxide ($Me_4POH$), tetraethyl phosphonium hydroxide ($Et_4POH$), tetrabutyl phosphonium hydroxide ($Bu_4POH$), benzyltrimethyl phosphonium hydroxide ($Ph-CH_2(Me)_3POH$) and hexadecyltrimethyl phosphonium hydroxide; and basic salts such as tetramethyl phosphonium borohydride ($Me_4PBH_4$), tetrabutyl phosphonium borohydride ($Bu_4PBH_4$), tetrabutyl phosphonium tetraphenyl borate ($BU_4PBPh_4$) and tetramethyl phosphonium tetraphenyl borate ($Me_4PBPh_4$).

The basic nitrogen compound and/or basic phosphorus compound are/is used in an amount of $1\times10^{-5}$ to $5\times10^{-4}$ chemical equivalent in terms of basic nitrogen atoms or basic phosphorus atoms based on 1 mol of the aromatic dihydroxy compound. The amount of the basic nitrogen compound and/or basic phosphorus compound are/is more preferably $2\times10^{-5}$ to $5\times10^{-4}$ chemical equivalent based on the same standard. The amount is particularly preferably $5\times10^{-5}$ to $5\times10^{-4}$ chemical equivalent based on the same standard.

The alkali metal compound used as a catalyst may be the ate-complex alkali metal salt of the group XIV element of the periodic table or the alkali metal salt of the oxo acid of the group XIV element of the periodic table as desired. The group XIV element of the periodic table is silicon, germanium or tin. By using the alkali metal compound as a polycondensation reaction catalyst, a polycondensation reaction can proceed quickly and completely. In addition, the alkali metal compound can control an undesired secondary reaction such as a branching reaction which proceeds during the polycondensation reaction to a low level.

What are enumerated in JP-A 7-268091 may be used as the ate-complex alkali metal salt of the group XIV element of the periodic table, as exemplified by $NaGe(OMe)_5$, $NaGe(OPh)_5$, $LiGe(OMe)_5$, $LiGe(OPh)_5$, $NaSn(OMe)_3$, $NaSn(OMe)_5$, $NaSN(OPh)_5$, and the like.

The alkali metal salt of the oxo acid of the group XIV element of the periodic table is preferably the alkali metal salt of silicic acid, stannic acid, germanium (II) acid or germanium (IV) acid.

Illustrative examples of the above alkali metal salt include disodium orthosilicate, disodium monostannate, tetrasodium monostannate, monosodium germanate(II) ($NaHGeO_2$), disodium orthogermanate(IV), tetrasodium orthogermanate (IV) and the like.

In the polycondensation reaction, at least one compound selected from the group consisting of oxo acids and oxides of the group XIV elements of the periodic table and alkoxides and phenoxides of the same elements may be optionally existent as a co-catalyst together with the above alkali metal compound catalyst.

By using the co-catalyst, undesired phenomena such as a branching reaction which easily occurs during the polycondensation reaction, a main-chain cleavage reaction, the formation of foreign matter in the apparatus during molding and yellowing can be suppressed effectively without reducing the rate of molecular terminal capping reaction and the rate of polycondensation reaction.

The oxo acids of the group XIV elements of the periodic table include silicic acid, stannic acid and germanic acid.

The oxides of the group XIV elements of the periodic table include silicon dioxide, tin dioxide, germanium monoxide, germanium dioxide, silicon tetramethoxide, silicon tetrabutoxide, silicon tetraphenoxide, tetraethoxy tin, tetranonyloxy tin, tetraphenoxy tin, tetramethoxy germanium, tetrabutoxy germanium, tetraphenoxy germanium and condensates thereof.

The co-catalyst is preferably existent in such a proportion that the amount of the group XIV element of the periodic table becomes 50 molar atoms or less based on 1 molar atom of an alkali metal element contained in the polycondensation reaction catalyst. When the co-catalyst is used in such a proportion that the amount of the metal element is more than 50 molar atoms, the polycondensation reaction slows down disadvantageously. The co-catalyst is more preferably existent in such a proportion that the amount of the group XIV element of the periodic table becomes 0.1 to 30 molar atoms based on 1 molar atom of the alkali metal element contained in the polycondensation reaction catalyst.

The aromatic polycarbonate composition of the present invention comprises 100 parts by weight of the aromatic polycarbonate used in the present invention and a combination of a free P(III) compound and a free P (V) compound.

The P(III) compound is a phosphorous acid ester such as those represented by the following formula.

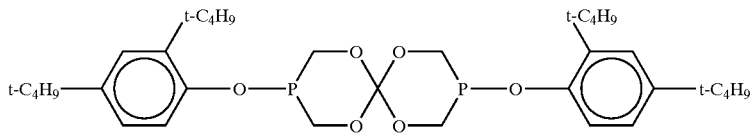

Illustrative example of the P(III) compound include arylalkyl phosphites such as bis(2,4-di-t-butylphenyl)pentaerythrityl diphosphite, bis(2,6-di-t-butyl-4-methylphenyl)pentaerythrityl diphosphite, bis(nonylphenyl)pentaerythrityl diphosphite, diphenyldecyl phosphite, diphenylisooctyl phosphite, phenyldiisooctyl phosphite, 2-ethylhexyldiphenyl phosphite, tetraphenylpropylene glycol diphosphite, tetrakis(tridecyl)-4,4'-isopropylidenediphenyl diphosphite, 2,2-methylenebis(4,6-di-t-butylphenyl)octyl phosphite and 2-{{2,4,8,10-tetrakis(1,1-dimethylethyl)dibenzo{d,f}{1,3,2}dioxaphosphepin-6-yl}oxy}-N,N-bis{2-{{2,4,8,10-tetrakis(1,1-dimethylethyl)dibenzo{d,f}{1,3,2}dioxaphosphepin-6-yl}oxy}-ethyl}ethanamine; trialkyl phosphites such as trimethyl phosphite, triethyl phosphite, tributyl phosphite, trioctyl phosphite, trinonyl phosphite, tridecyl phosphite, trioctadecyl phosphite, distearyl pentaerythrityl diphosphite, bis(tridecyl)pentaerythrityl diphosphite, tris(2-chloroethyl)phosphite and tris(2,3-dichloropropyl)phosphite; tricycloalkyl phosphites such as tricyclohexyl phosphite; triaryl phosphites such as triphenyl phosphite, tricresyl phosphite, tris(ethylphenyl)phosphite, tris(2,4-di-t-butylphenyl)phosphite, tris(nonylphenyl)phosphite and tris(hydroxyphenyl)phosphite; (hydrogenated bisphenol-A, pentaerythrityl phosphite polymer) and the like.

Out of these, preferred are arylalkyl phosphites, particularly bis(2,4-t-butylphenyl)pentaerythrityl diphosphite, and triaryl phosphites, particularly compounds represented by the following formula:

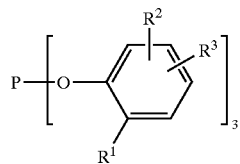

wherein $R^1$ is a t-butyl group, t-amyl group or cumyl group, and $R^2$ and $R^3$ are each independently a hydrogen atom, t-butyl group, t-amyl group or cumyl group, more particularly tris(2,4-di-t-butylphenyl)phosphite. The free P(III) compounds may be used alone or in combination of two or more.

Illustrative example of P(V) compound include phosphorus acid ester exemplified by arylalkyl phosphates such as bis(2,4-di-t-butylphenyl)pentaerythrityl diphosphate, pentaerythrityl (2,4-di-t-butylphenyl)phosphate (2,4-di-t-butylphenyl)phosphite, bis(2,6-di-t-butyl-4-methylphenyl)pentaerythrityl diphosphate, pentaerythrityl(2,6-di-t-butyl-4-methylphenyl)phosphate (2,6-di-t-butyl-4-methylphenyl)phosphite, bis(nonylphenyl)pentaerythrityl diphosphate, pentaerythrityl(nonylphenyl)phosphate (nonylphenyl)phosphite, diphenyldecyl phosphate, diphenylisooctyl phosphate, phenyldiisooctyl phosphate, 2-ethylhexyldiphenyl phosphate, tetraphenylpropylene glycol diphosphate, propylene glycol diphenyl phosphate diphenyl phosphite, tetrakis(tridecyl)-4,4'-isopropylidenediphenyl diphosphate, 4,4'-isopropylidenediphenyl bis(tridecyl)phosphate bis(tridecyl)phosphite and 2,2-methylenebis(4,6-di-t-butylphenyl)octylphosphate; trialkyl phosphates such as trimethyl phosphate, triethyl phosphate, tributyl phosphate, trioctyl phosphate, trinonyl phosphate, tridecyl phosphate, trioctadecyl phosphate, distearyl pentaerythrityl diphosphate, pentaerythrityl stearyl phosphate stearyl phosphite, bis(tridecyl)pentaerythrityl diphosphate, pentaerythrityl tridecyl phosphate, tridecyl phosphate, tris(2-chloroethyl)phosphate and tris(2,3-dichloropropyl)phosphate; tricycloalkyl phosphates such as tricyclohexyl phosphate; triaryl phosphates such as triphenyl phosphate, tricresyl phosphate, tris(ethylphenyl)phosphate, tris(2,4-di-t-butylphenyl)phosphate, tris(nonylphenyl)phosphate and tris(hydroxyphenyl)phosphate; hydrogenated bisphenol-A, pentaerythrityl phosphate polymers and the like.

Out of these, preferred are arylalkyl phosphates, particularly bis(2,4-di-t-butylphenyl)pentaerythrityl phosphate, and triaryl phosphates, particularly compounds represented by the following formula:

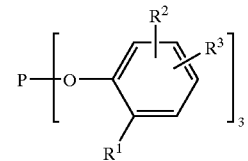

wherein $R^1$ is a t-butyl group, t-amyl group or cumyl group, and $R^2$ and $R^3$ are each independently a hydrogen atom, t-butyl group, t-amyl group or cumyl group,
more particularly tris(2,4-di-t-butylphenyl)phosphate.
The P(V) compounds may be used alone or in combination of two or more.

The free P(III) compound and the free P(V) compound contained in the polycarbonate preferably have the same ester moiety skeleton.

The amounts of the above P(III) compound and P(V) compound satisfy the following expression:

$$0.1 \leq P(V) \leq 3 \times P(III)^{0.7} + 2 \times (OH)^{0.2}$$

preferably the following expression:

$$0.1 \times P(III)^{0.5} + 0.03(OH)^{0.3} \leq P(V) \leq 3 \times P(III)^{0.5} + 2 \times (OH)^{0.2}$$

wherein P(V) is the weight-based content (ppm) of the P(V) compound in terms of phosphorus atoms and P(III) is the weight-based content (ppm) of the P(III) compound in terms of phosphorus atoms.

These free phosphorus compounds are contained in a total amount of $5 \times 10^{-6}$ to $6.5 \times 10^{-3}$ part by weight, preferably $1.0 \times 10^{-5}$ to $5 \times 10^{-3}$ part by weight, more preferably $5 \times 10^{-5}$ to $4 \times 10^{-3}$ part by weight in terms of phosphorus atoms based on 100 parts by weight of the aromatic polycarbonate.

Further, these free phosphorus compounds are contained in such a ratio that satisfies the following expression (2):

$$0.1 \times P(III)^{0.5} + 0.05 \times (OH)^{0.3} \leq P(V) \leq 3 \times P(III)^{0.5} + 1 \times (OH)^{0.2}$$

wherein P(V) and P(III) are as defined hereinabove and OH is the concentration (eq/ton) of molecular terminal OH groups, more preferably the following expression (2)-1:

$$0.1 \times P(III)^{0.5} + 0.1 \times (OH)^{0.3} \leq P(V) \leq 3 \times P(III)^{0.5} + 1 \times (OH)^{0.2} \quad (2)\text{-}1.$$

The composition of the present invention contains bonded phosphorus atoms and the phosphorus atoms of the free phosphorus compounds in a total amount of preferably $1.0 \times 10^{-5}$ to $8.0 \times 10^{-3}$ part by weight, more preferably $2 \times 10^{-5}$ to $7 \times 10^{-3}$ part by weight based on 100 parts by weight of the above aromatic polycarbonate.

Further, the ratio of the bonded phosphorus atoms to the phosphorus atoms of the free phosphorus compounds in the composition of the present invention is preferably 1:4 to 4:1, more preferably 1:3 to 3:1.

A method, for example, to introduce the bonded phosphorus atoms to the aromatic polycarbonate is as follows.

Before the catalyst is deactivated and neutralized (polymerization ends upon the neutralization and deactivation of the catalyst), the phosphorus compounds are introduced into a reaction system to bond phosphorus atoms to the molecule of a polycarbonate for the production of a polycarbonate.

These operations can be carried out easily using a polymerization reactor or kneading extruder.

The atmosphere in which these operations are carried out is preferably an atmosphere free from oxidation gas such as oxygen, at least at an oxygen concentration of 1 ppm or less.

When a kneading extruder is used, it is preferably pressurized with nitrogen gas to prevent oxygen from entering the extruder.

The free phosphorus compounds are mixed with an aromatic polycarbonate as follows, for example.

(1) With the same operation as that for the introduction of the above bonded phosphorus atoms, the P(III) compound or P(V) compound is added after the end of polymerization of a polycarbonate, that is, the deactivation of a polymerization catalyst, or (2) after the P(III) compound is added in the same manner as in (1), a polycarbonate resin composition is oxidized in the air at a temperature near the glass transition temperature of a polycarbonate to adjust the amount of the free P(V) compound.

Since the oxidation time changes according to the size of a polycarbonate sample chip, oxidation is carried out while measuring the amount of the P(V) compound. This oxidation is preferably carried out for 5 to 30 days, for example.

The composition of the present invention preferably contains an alkali metal compound in an amount of 10 to 800 ppb in terms of an alkali metal. The alkali metal compound is derived from the ester exchange catalyst, co-catalyst or various additives added to the composition, all of which are used for the production of the aromatic polycarbonate.

The aromatic polycarbonate (A) of the present invention preferably has a melt viscosity stability of 0.5% or less. The melt viscosity stability is more preferably 0.3% or less, much more preferably 0.1% or less, particularly preferably 0%.

To control the melt viscosity stability to 0.5% or less, a melt viscosity stabilizer (E) is added in a specific amount to the aromatic polycarbonate after the end of a polycondensation reaction, preferably after the end of a terminal capping reaction. An aromatic polycarbonate which is inferior in melt viscosity stability lacks stability during molding and experiences instability in mechanical properties, particularly marked deterioration or reduction in impact resistance, at a high humidity and when its molded product is used for a long time and hence, cannot be put to practical use.

The metal viscosity stabilizer used in the present invention is preferably a compound represented by the following formula (3):

$$A^1-(SO_3X^1)_m \quad (3)$$

wherein $A^1$ is a hydrocarbon group having 1 to 20 carbon atoms which may have a substituent, $X^1$ is an ammonium cation, phosphonium cation or alkyl group having 1 to 10 carbon atoms, and m is an integer of 1 to 4.

Illustrative examples of the compound represented by the above formula (3) include phosphonium salts such as tetrabutylphosphonium octylsulfonate, tetramethylphosphonium benzenesulfonate, tetrabutylphosphonium benzenesulfonate, tetrabutylphosphonium dodecylbenzenesulfonate and tetrabutylphosphonium p-toluenesulfonate; ammonium salts such as tetramethylammonium decylsulfonate and tetrabutylammonium dodecylbenzenesulfonate; and alkyl esters such as methyl benzenesulfonate, butyl benzenesulfonate, methyl p-toluenesulfonate, butyl p-toluenesulfonate and ethyl hexadecylsulfonate.

Although the melt viscosity stabilizer is effective for a polycarbonate produced by the phosgene method, it is used for a polycarbonate produced by the melt-polymerization or solid-phase polymerization method in an amount of preferably 0.7 to 100 equivalents, more preferably 0.8 to 30 equivalents, much more preferably 0.9 to 20 equivalents, particularly preferably 0.9 to 10 equivalents based on 1 equivalent of the alkali metal compound of the ester exchange catalyst.

When a sulfonic acid alkyl ester is used out of the above melt viscosity stabilizers, it is preferred to subject the aromatic polycarbonate to a vacuum treatment. When the vacuum treatment is to be made, a treatment device is not limited to a particular type. When a sulfonic acid phosphonium salt or sulfonic acid ammonium salt is used, it cannot be said that it is preferred to subject the aromatic polycarbonate to the vacuum treatment.

The vacuum treatment is carried out in a vertical vessel type reactor, horizontal vessel type reactor, or vented single-screw or double-screw extruder at a reduced pressure of preferably 0.05 to 100 mmHg (6.65~1.33×10$^4$ Pa), more preferably 0.05 to 60 mmHg (6.65~7.98×10$^3$ Pa).

The vacuum treatment time is 5 minutes to 3 hours in the case of a vessel type reactor and 5 seconds to 15 minutes in the case of double-screw extruder. The treatment temperature is preferably 240 to 350° C. The vacuum treatment can be carried out simultaneous with pelletizing with an extruder. The raw material monomer remaining in the aromatic polycarbonate is reduced or removed completely by carrying out the above vacuum treatment.

The thus obtained aromatic polycarbonate has excellent moldability and residence stability, and is particularly excellent in thermal stability and color stability, and advantageous to attain the object of the present invention.

A heat-resistant stabilizer does not have to be added to the aromatic polycarbonate (A) of the present invention but an ordinary heat-resistant stabilizer may be optionally added in limits that do not impair the object of the present invention. The stabilizer is, for example, a phosphorus-based stabilizer (other than the above melt viscosity stabilizers), steric hindered phenol-based stabilizer, organic thioether-based stabilizer or hindered amine-based stabilizer.

Examples of the phosphorus-based stabilizer include phosphonites such as tetrakis(2,4-di-t-butylphenyl)-4,4- biphenylene diphosphonite, tetrakis(2,4-di-t-butylphenyl)-4, 4'-phenylene diphosphinate and the like. They may be used alone or in combination of two or more.

Examples of the steric hindered phenol-based stabilizer include n-octadecyl-3-(4'-hydroxy-3',5'-di-t-butylphenyl) propionate, tetrakis{methylene-3-(3',5'-di-t-butyl-4-hydroxyphenyl)propionate}methane, distearyl(4-hydroxy-3-methyl-5-t-butylbenzyl)malonate, triethylene glycol-bis{3-(3-t-butyl-5-methyl-4-hydroxyphenyl)propionate}, 1,6-hexanediol-bis(3-(3,5-di-t-butyl-4-hydroxyphenyl) propionate), pentaerythrityltetrakis{3-(3,5-di-t-butyl-4-hydroxyphenyl)propionate), 2,2-thiodiethylenebis{3-(3,5-di-t-butyl-4-hydroxyphenyl)propionate}, 2,2-thiobis(4-methyl-6-t-butylphenol), 1,3,5-trimethyl-2,4,6-tris(3,5-di-t-butyl-4-hydroxybenzyl)benzene, tris(3,5-di-t-butyl-4-hydroxybenzyl)-isocyanurate, 2,4-bis{(octylthio)methyl}-o-cresol, isooctyl-3-(3,5-di-t-butyl-4-hydroxyphenyl) propionate, 2,5,7,8-tetramethyl-2(4',8',12'-trimethyltridecyl) chroman-6-ol and the like. They may be used alone or in combination of two or more.

Examples of the organic thioether-based stabilizer include dilauryl thiodipropionate, distearyl thiodipropionate, dimyristyl-3,3'-thiodipropionate, 1-ditridecyl-3,3'-thiopropionate, pentaerythritoltetrakis-(β-lauryl-thiopropionate) and the like. They may be used alone or in combination of two or more.

Examples of the hindered amine-based stabilizer include bis(1,2,2,6,6-pentamethyl-4-piperidyl)sebacate, 1-[2-{3-(3, 5-di-t-butyl-4-hydroxyphenyl)propionyloxy}ethyl]-4-{3-(3, 5-di-t-butyl-4-hydroxyphenyl)propionyloxy}-2,2,6,6-tetramethylpiperidine, 4-benzoyloxy-2,2,6,6-tetramethylpiperidine, bis(1,2,2,6,6-pentamethyl-4-piperidyl) 2-(3,5-di-t-butyl-4-hydroxybenzyl)-2-n-butyl malonate and the like. They may be used alone or in combination of two or more.

The heat-resistant stabilizer may be used in an amount of preferably 0.0001 to 5 parts by weight, more preferably 0.0005 to 1 part by weight, much more preferably 0.001 to 0.5 part by weight based on 100 parts by weight of the aromatic polycarbonate.

A compound having at least one epoxy group in the molecule may be used as an acidic substance trapping agent.

Illustrative examples of the acidic substance trapping agent include epoxydated soybean oil, phenylglycidyl ether, 3,4-epoxy-6-methylcyclohexylmethyl-3',4'-epoxy-6'-methylcyclohexyl carboxylate, 3,4-epoxycyclohexylethylene oxide, bisphenol A diglycidyl ether, 2-ethylhexyl-3',4'-epoxycyclohexyl carboxylate, 4,5-epoxy tetrahydrophthalate anhydride and the like.

Out of these, alicyclic epoxy compounds are preferred, and 3,4-epoxycyclohexylmethyl-3',4'-epoxycyclohexyl carboxylate is particularly preferred. The epoxy compound is added in an amount of preferably 1 to 2,000 ppm, more preferably 10 to 1,000 ppm based on the aromatic polycarbonate. The above epoxy compounds may be used alone or in combination of two or more.

The aromatic polycarbonate composition of the present invention may further contain a releasing agent. The releasing agent is preferably a higher fatty acid ester. The higher fatty acid ester is preferably a partial ester of a higher aliphatic carboxylic acid and a polyhydric alcohol. The high fatty acid ester is used in an amount of preferably 0.005 to 0.5 part by weight, more preferably 0.007 to 0.5 part by weight, particularly preferably 0.01 to 0.3 part by weight based on 100 parts by weight of the aromatic polycarbonate composition of the present invention. Sufficiently high heat resistance, releasability and micron-order transfer are made possible by using the higher fatty acid ester in the above range.

The expression "partial ester of an aliphatic carboxylic acid and a polyhydric alcohol" as used herein means a partial ester of an aliphatic carboxylic acid and a polyhydric alcohol of which at least one hydroxyl group is unreacted.

The higher aliphatic carboxylic acid is either a saturated or unsaturated higher aliphatic carboxylic acid. The higher aliphatic carboxylic acid is preferably a saturated aliphatic carboxylic acid, particularly preferably a saturated aliphatic carboxylic acid having 12 to 24 carbon atoms. When the number of carbon atoms is below the above range, the produced polycarbonate-based resin composition tends to generate gas. When the number of carbon atoms is above the range, the releasability of the polycarbonate-based resin composition is apt to lower. Examples of the higher aliphatic carboxylic acid include dodecanoic acid, palmitic acid, stearic acid, arachic acid, behenic acid, lignoceric acid and the like.

The polyhydric alcohol is not particularly limited and may be a divalent, trivalent, tetravalent, pentavalent or hexavalent alcohol. For example, it is preferably ethylene glycol, glycerin, trimethylol propane and pentaerythritol, particularly preferably glycerin.

The releasing agent is preferably a monoglyceride and/or diglyceride of a saturated aliphatic monocarboxylic acid having 12 to 24 carbon atoms.

The partial ester of an aliphatic carboxylic acid and a polyhydric alcohol used in the present invention can be obtained through a general esterification reaction.

Further, in the present invention, other conventionally known releasing agents may be used instead of or together with the above higher fatty acid ester releasing agents. Hydrocarbon releasing agents include natural and synthetic paraffin waxes, polyethylene wax and fluorocarbons. Fatty acid releasing agents include higher fatty acids such as stearic acid and hydroxystearic acid, oxyfatty acids and the like. Fatty acid amide releasing agents include fatty acid amides such as stearic acid amide and ethylenebisstearyl amide, and alkylenebis fatty acid amides such as erucic acid amide.

Alcohol releasing agents include aliphatic alcohols such as stearyl alcohol, polyhydric alcohols, polyglycols and polyglycerols. Polysiloxanes may also be used.

The aromatic polycarbonate composition of the present invention may contain conventionally known additives such as an photo-stabilizer, ultraviolet light absorber, metal inactivating agent, quencher, metal soap, nucleating agent, antistatic agent, flame retardant and colorant to attain desired purposes.

Examples of the photo-stabilizer include benzotriazole-based compounds such as 2-(3-t-butyl-2-hydroxy-5-methylphenyl)-5-chlorobenzotriazole, 2-(3,5-di-t-butyl-2-hydroxyphenyl)benzotriazole, 2-(2-hydroxy-5-t-octylphenyl)benzotriazole and 2-{2-hydroxy-3-(3,4,5,6-tetrahydrophthalimidemethyl)phenyl}benzotriazole; benzophenone-based compounds such as 2-hydroxy-4-octyloxybenzophenone; and benzoate-based compounds such as 2,4-di-t-butylphenyl and 3,5-di-t-butyl-4-hydroxy benzoate.

Examples of the ultraviolet light absorber include cyanoacrylate-based compounds such as ethyl 2-cyano-3,3-diphenyl acrylate.

These photo-stabilizer and ultraviolet light absorber may be used in an amount of preferably 0.001 to 5 parts by weight, more preferably 0.05 to 1.0 part by weight, more preferably 0.01 to 0.5 part by weight based on 100 parts by weight of the aromatic polycarbonate. These agents may be used alone or in combination.

Examples of the quencher include nickel-based quenchers such as nickel dibutyl dithiocarbamate.

Examples of the metal inactivating agent include compounds such as N,N'-(3-(3,5-di-t-butyl-4-hydroxyphenyl) propionyl)hydrazine.

Examples of the metal soap include compounds such as calcium stearate.

Examples of the nucleating agent include sorbitol-based and phosphate-based compounds such as sodium di(4-t-butylphenyl)phosphonate, dibenzylidene sorbitol and methylenebis(2,4-di-t-butylphenol)acid phosphate sodium salt.

Examples of the antistatic agent include quaternary ammonium salt-based compounds such as lauramidepropyl) trimethyl ammonium sulfate and alkyl phosphate-based compounds.

Examples of the flame retardant include halogen-containing phosphates such as tris (2-chloroethyl)phosphate, halides such as hexabromocyclododecane and decabromophenyl oxide, metal inorganic compounds such as antimony trioxide, antimony pentoxide and aluminum hydroxide, and mixtures thereof.

The colorant may be an organic or inorganic dye or pigment as follows.

Examples of the inorganic colorant include oxides such as titanium dioxide and iron oxide red, hydroxides such as alumina white, sulfides such as zinc sulfide, selenides, ferrocyanides such as iron blue, chromates such as zinc chromate and molybdenum red, sulfates such as barium sulfate, carbonates such as calcium carbonate, silicates such as ultramarine blue, phosphates such as manganese violet, carbon such as carbon black, and metal colorants such as bronze powders and aluminum powders.

Examples of the organic colorant include nitroso-based colorants such as Naphthol Green B, nitro-based colorants such as Naphthol Yellow S, azo-based colorants such as Naphthol Red and Chromophthal Yellow, phthalocyanine-based colorants such as Phthalocyanine Blue and Fast Sky Blue, and condensation polycyclic colorants such as Indanthrone Blue and Quinacridone Violet.

These colorants may be used alone or in combination. The colorant may be used in an amount of preferably $1\times10^{-6}$ to 5 parts by weight, more preferably $1\times10^{-6}$ to 3 parts by weight, particularly preferably $1\times10^{-5}$ to 1 part by weight based on 100 parts by weight of the aromatic polycarbonate.

The aromatic polycarbonate composition of the present invention can be molded into various moldings. For example, to mold a disk substrate, general molding methods such as injection molding and compression molding, and other methods such as ultrasonic molding, multi-stage compression molding and high-speed filling molding may be employed using a metal mold for forming disks.

The molding temperature is preferably 300 to 390° C., more preferably 310 to 350° C., and the temperature of the metal mold is preferably 75 to 130° C. To reduce birefringence and improve transferability, the temperature of the aromatic polycarbonate composition is preferably set high. When the molding temperature is higher than 390° C., it is worried that the thermal decomposition of the composition may occur and impurities may be formed in a molded product, thereby reducing transparency. Transparency is one of physical properties essential to a substrate. The temperature of the metal mold is preferably higher to improve flowability. When the temperature of the metal mold is 130° C. or more, a molded product may be warped and not usable as a substrate.

Further, the injection rate is preferably 150 cm$^3$/sec or more, more preferably 200 cm$^3$/sec or more. When the injection rate is lower than 150 cm$^3$/sec, a molding material is quenched in the metal mold to augment its flow pressure loss and resin alignment with the result that a molded product may be distorted.

The material of the metal mold is not limited to a particular kind and may be a metal, ceramic, graphite or the like. The substrate thus molded can be advantageously used as a substrate for read only, write only, and rewritable digital video disks. To produce a digital video disk using the substrate of the present invention, the same method as used in the production of a general compact disk can be employed.

In the film forming step, two laminates, each consisting of a substrate, a recording film and a protective film formed on the substrate, and a hard coat layer and optionally an overcoat layer formed on the protective film are bonded together with an ultraviolet light curable resin adhesive in accordance with a commonly used method.

EXAMPLES

The following examples are provided for the purpose of further illustrating effects of the present invention but are in no way to be taken as limiting.

1) Measurement of Viscosity Average Molecular Weight of Polycarbonate

The intrinsic viscosity [η] of a polycarbonate is measured in methylene chlorine at 20° C. with an Ubbellohde viscometer and the viscosity average molecular weight of the polycarbonate is calculated from the intrinsic viscosity according to the following equation.

$$[\eta]=1.23\times10-4MV^{0.83}$$

2) Concentration of Terminal Hydroxyl Groups 0.02 g of a sample is dissolved in 0.4 ml of bichloroform to measure the concentrations of terminal hydroxyl groups and terminal phenyl groups using 1H NMR (of JEOL Ltd.; EX-270) at 20° C.

3) Melt Viscosity Stability

The absolute value of a change in melt viscosity measured with the RAA type flow analyzer of Rheometrics Co., Ltd. under a nitrogen air stream at a shearing speed of 1 rad/sec and at 300° C. for 30 minutes after changes in melt viscosity become stable to obtain a change rate per minute. To obtain high long-term and short-term resin stabilities of the polycarbonate, the value should not exceed 0.5%.

4) Analysis of Phosphorus

4)-(1) Analysis of All Phosphorus Atoms and Bonded Phosphorus Atoms; [P(III)+P(V)]

a) analysis of all phosphorus atoms; sample, polycarbonate b) analysis of bonded phosphorus atoms; sample, polycarbonate after extraction of soluble phosphorus atoms 1 to 2 g of each sample is accurately weighed and injected into a glass beaker, about 1 ml of sulfuric acid of a reagent special grade, 20 to 30 ml of nitric acid and evaporated at 30° C., condensed and dried up, and 2.0 ml of a siliation reagent (BSTFA of Tokyo Kasei Kogyo Co., Ltd.) is added to introduce trimethylsilyl into the polycarbonate. The obtained product is transferred to a 5 ml graduated flask and acetonitrile (for high-speed liquid chromatography) is added to set the total quantity to 5 ml. The obtained solution is analyzed by GC and GC/MS.

1.0 μl of a pretreated acetonitrile solution is injected into GC and analyzed by elevating the temperature. The detected peak compound is identified from the position of a detected peak and GC/MS analysis and the quantity of the compound is determined from the area of the peak. analytical conditions device 5890 series II of Hewlett Packard Co., Ltd. integrator HP3396 series II of Hewlett Packard Co., Ltd. detector frame ionization detector of Hewlett Packard Co., Ltd.

temperature 300° C.; column DB-5 (J & W) 5% phenyl-methyl silicone; column length; 30 m, column diameter; 0.25 mm thickness of film; 0.1 μm; temperature; starting temperature of 100° C.; (maintained for 1.0 min), final temperature of 300° C.; (maintained for 10.0 min); temperature elevation rate: 20° C./min; carrier gas flow rate of He; 60 ml/min;

5) Measurement of Acid Value

5)-(1) Polycarbonate Resin, Composition

About 1 g of a sample is accurately weighed and dissolved in 100 ml of chloroform, diluted with benzyl alcohol to a volume of 100 ml. The resulting solution is titrated about 1 ml of perchloric acid are added to the glass beaker, and the resulting solution is heated on a hot plate at about 200° C. for 1 to 2 days to be decomposed until it becomes achromatic to light yellow in accordance with a commonly used method. (The nitric acid is added in an appropriate amount to prevent the sample from being dried up.)

The slightly wet decomposed product is dissolved in nitric acid of a reagent special grade and injected into a 10 ml graduated flask to determine its quantity. At the same time, a blank experimental liquid (reagent blank) is prepared by the same operation as the sample. The quantity of phosphorus atoms contained in each sample: [P(III)+P(V)] contained in each sample is determined by correcting a blank experimental value measured by ICP emission spectral analysis in accordance with an absolute calibration curve method.

| analytical conditions ICP emission spectral analyzer; SPS1200VR of Seiko Instruments Co., Ltd. | |
|---|---|
| measurement wavelength | 177.50 nm |
| plasma output | 1.3 kW |
| photometering height | 15 mm |
| flow rate of plasma gas | 16 l/min |
| flow rate of nebulized gas | 1.0 l/min |
| flow rate of auxiliary gas | 0.5 l/min |

4-(2) Identification and Quantity Determination of Free Phosphorus Atoms; [P(III) and P(V)]

About 5 g of a PC sample is accurately weighed and injected in a 300 ml beaker to be dissolved in 40 ml of methylene chloride (of a reagent special grade). Methanol (of a reagent special grade) is added dropwise under agitation with ultrasonic waves to set the total quantity to 150 ml. The precipitated polycarbonate is separated by filtration (filter; No. 2 of Toyo Roshi Co., Ltd.), the filtrate is with a 0.01 N benzyl alcohol solution of NaOH using phenol red as an indicator.

5)-(2) Additive

About 1 g of a sample is accuately weighed, dissolved in 100 ml of benzyl alcohol and titrated in the same manner as in (1). device; COOH measurement instrument (Model; COM-3) of Seiwa Gikenn Co., Ltd.

6) Residence Stability

A plate measuring 50 mm×50 mm×2 mm is formed into sample 1 with the M50B injection molding machine of Meiki Seisakusho Co., Ltd. at a cylinder temperature of 380° C., a mold temperature of 750° C., an injection pressure of 300 kg and a clamping force of 50 tons.

Thereafter, the sample is retained in a cylinder at the same temperature for 15 minutes to form sample 2.

The colors, L, a and b values of these two plates are measured with the Z-1001DP color difference meter of Nippon Denshoku Co., Ltd. to obtain ΔE from the following equation.

$$\Delta E = [(L1-L2)^2 + (a1-a2)^2 + (b1-b2)^2]^{1/2}$$

When the value ΔE is larger than 3, a change in the color of a molded product becomes large by fluctuations in the molding conditions of the molded product and the commercial value of the molded product is greatly impaired.

To suppress a change in the color of the molded product, it is the best that the value ΔE should be "0". When the value is 1 or less, the molded product is excellent, when the value is 2.0 to less than 2.5, the molded product is satisfactory, and when the value is 2.5 to less than 3.0, the molded product is acceptable.

7) Disk Releasability; Mold Stains

The obtained polycarbonate composition pellets are used, a mold exclusive for DVD is set in the DISK3 MIII of Sumitomo Heavy Industries, Ltd., a nickel DVD stamper which stores information such as an address signal is set in this mold, the above composition pellets are supplied into the hopper of a molding machine automatically, and 10K DVD disk substrates having a diameter of 120 mm and a thickness of 0.6 mm are formed at a cylinder temperature of 380° C., a mold temperature of 115° C., an injection rate of 200 mm/sec and a holding pressure of 3,432 kPa (35 kgf/cm$^2$).

When the number of disk substrates which could not removed from the mold smoothly by an apparatus after molding is 10 or more, disk releasability is judged as X, when the number is 3 to 9, disk releasability is judged as ○, and when the number of 2 or less, disk releasability is judged as ⊙.

Stains on the stamper after molding are checked with the eye. When stains on the stamper are hardly observed or very few, they are judged as ⊙, when stains are few, they are judged as ○, and when stains are obviously observed, they are judged as X.

1. Examples 1 to 14 18 and 19, Comparative Examples 1 to 6: MW=13,500

(Production Example of Polycarbonates)

22.8 parts by weight of bisphenol A, 22.0 parts by weight of diphenyl carbonate, 4×10$^{-6}$ part by weight of NaOH as a polymerization catalyst, and 9.1×10$^{-4}$ part by weight of tetramethyl ammonium hydroxide were charged into a reactor equipped with a stirrer, a distillation column and a vacuum generating equipment and dissolved at 140° C. after the inside of the reactor was substituted with nitrogen. After 30 minutes of agitation, a reaction was carried out for 30 minutes by elevating temperature inside the reactor to 180° C. and reducing pressure inside the reactor to 1.33×10$^4$ Pa and the formed phenol was distilled off.

Thereafter, the reaction was continued for 30 minutes by gradually increasing the inside temperature to 200° C. and reducing the inside pressure to 0.67×10$^4$ Pa while phenol was distilled off. The reaction was further continued for 30 minutes by gradually elevating the temperature to 220° C. and reducing the pressure to 4.0×10$^3$ Pa. The reaction was still further continued by increasing the temperature and reducing the pressure to the three stage of 240° C. and $1.33 \times 10^3$ Pa, 260° C. and $1.33 \times 10^2$ Pa and 260° C. and $1.33 \times 10^2$ Pa or less, respectively.

Finally, the polymerization reaction was continued at the temperature of 260° C. and the pressure of $1.33 \times 10^2$ Pa or less to obtain a polycarbonate resin having a viscosity average molecular weight of 13,500. When part of the obtained polymer was sampled to measure its concentration of terminal hydroxyl groups, it was found to be 100 eq/ton.
(Formation of Phosphorus Bonded PC)

Thereafter, phosphorus compounds A1 to A6 shown in the bonded P columns of Tables 1 and 2 were added and reacted at 260° C. and $1.33 \times 10^4$ Pa for 10 minutes to obtain polycarbonate resins containing predetermined amounts of bonded phosphorus shown in Tables 1 and 2.
(Adjustment of Terminal Hydroxyl Groups)

Predetermined amounts of 2-methoxycarbonylphenyl-phenyl-carbonate (abbreviated as SAMDPC) shown in the terminal capping agent columns of Tables 1 and 2 were added to the above polycarbonate resins having a terminal hydroxyl group concentration of 100 eq/ton at $0.67 \times 10^4$ Pa and 270° C. and then a terminal capping reaction was continued for 5 minutes at 270° C. and $1.33 \times 10^2$ Pa or less to obtain polycarbonate resins having a concentration of terminal hydroxyl groups shown in Tables 1 and 2.
(Stabilization of Melt Viscosity)

$8.8 \times 10^{-5}$ part by weight (1.5 times the equivalent of an Na catalyst) of purified tetrabutylphosphonium dodecylbenzene sulfonate (abbreviated as DBSP) shown in the deactivator columns of Tables 1 and 2 was added as a melt viscosity stabilizer, mixed and stirred at the same temperature and the same pressure for 10 minutes to deactivate and inactivate the catalyst and polycarbonate resins having a viscosity average molecular weight of 13,500 (Examples 1 to 14, 18 and 19, Comparative Examples 1 to 6) shown in Tables 1 and 2 were obtained.
(Production of Polycarbonate Resin Compositions: Addition of Free Phosphorus Compounds and Other Stabilizers)

The above obtained phosphorus-containing polycarbonates were supplied into a double-screw extruder by a gear pump, free phosphorus compounds and a fatty acid ester as a releasing agent shown in Tables 3 to 6 were added under types and in amounts shown in Tables 3 to 6 to obtain polycarbonate resin compositions (Examples 1 to 14, 18 and 19, Comparative Examples 1 to 6) shown in Tables 3 to 6. The polycarbonate resin compositions were extruded into chips. The amounts of the added free phosphorus compounds shown in Tables 3 and 4 were based on 25.4 parts by weight of a polycarbbnate.

2. Examples 15 to 17: MW=15,000, 22,000, 30,000

Polycarbonate resins having respective molecular weights were produced in accordance with the above production examples of polycarbonates and bonded phosphorus was introduced by the compounds shown in Table 2 in the same manner as described above to obtain three different polycarbonate resins shown in Table 7 below.

TABLE 7

| Example No. | viscosity average molecular weight | concentration of terminal OH groups |
|---|---|---|
| 15 | 15,000 | 95 |
| 16 | 22,000 | 70 |
| 17 | 30,000 | 55 |

The concentration of terminal hydroxyl groups was adjusted by the compounds shown in Table 2 in the same manner as described above to stabilize melt viscosity and free phosphorus compounds, fatty acid ester and phenol-based stabilizer shown in Tables 4 and 6 were added under types and in amounts shown in Tables 4 and 6 to obtain polycarbonate resin compositions (Examples 15 to 17) shown in Tables 4 and 6.

3. Evaluation of Polycarbonate Resin Compositions

The above obtained polycarbonate resin compositions (Examples 1 to 19, Comparative Examples 1 to 6) were measured for their physical properties as shown in Tables 5 and 6. Further, disk substrates were formed and evaluated in accordance with the above methods.

TABLE 1

| | viscosity average molecular weight | catalyst: parts by weight | deactivator: parts by weight | terminal: parts by capping agent weight | terminal OH |
|---|---|---|---|---|---|
| Ex. 1 | 13500 | NaOH; $4.0 \times 10^{-6}$ TMAH; $9.1 \times 10^{-4}$ | DBSH; $8.8 \times 10^{-5}$ | SAMDPC; $4.88 \times 10^{-1}$ | 40 |
| C. Ex. 1 | 13500 | NaOH; $4.0 \times 10^{-6}$ TMAH; $9.1 \times 10^{-4}$ | DBSH; $8.8 \times 10^{-5}$ | SAMDPC; $4.88 \times 10^{-1}$ | 40 |
| C. Ex. 2 | 13500 | NaOH; $4.0 \times 10^{-6}$ TMAH; $9.1 \times 10^{-4}$ | DBSH; $8.8 \times 10^{-5}$ | SAMDPC; $4.88 \times 10^{-1}$ | 40 |
| Ex. 2 | 13500 | NaOH; $4.0 \times 10^{-6}$ TMAH; $9.1 \times 10^{-4}$ | DBSH; $8.8 \times 10^{-5}$ | SAMDPC; $4.88 \times 10^{-1}$ | 40 |
| Ex. 3 | 13500 | NaOH; $4.0 \times 10^{-6}$ TMAH; $9.1 \times 10^{-4}$ | DBSH; $8.8 \times 10^{-5}$ | SAMDPC; $4.88 \times 10^{-1}$ | 40 |
| C. Ex. 3 | 13500 | NaOH; $4.0 \times 10^{-6}$ TMAH; $9.1 \times 10^{-4}$ | DBSH; $8.8 \times 10^{-5}$ | SAMDPC; $4.88 \times 10^{-1}$ | 40 |
| Ex. 4 | 13500 | NaOH; $4.0 \times 10^{-6}$ TMAH; $9.1 \times 10^{-4}$ | DBSH; $8.8 \times 10^{-5}$ | SAMDPC; $4.88 \times 10^{-1}$ | 40 |
| Ex. 5 | 13500 | NaOH; $4.0 \times 10^{-6}$ TMAH; $9.1 \times 10^{-4}$ | DBSH; $8.8 \times 10^{-5}$ | SAMDPC; $4.88 \times 10^{-1}$ | 40 |
| C. Ex. 4 | 13500 | NaOH; $4.0 \times 10^{-6}$ TMAH; $9.1 \times 10^{-4}$ | DBSH; $8.8 \times 10^{-5}$ | SAMDPC; $4.88 \times 10^{-1}$ | 40 |

TABLE 1-continued

| | | | | | |
|---|---|---|---|---|---|
| Ex. 6 | 13500 | NaOH; 4.0 × 10⁻⁶<br>TMAH; 9.1 × 10⁻⁴ | DBSH; 8.8 × 10⁻⁵ | SAMDPC; 4.88 × 10⁻¹ | 40 |
| Ex. 7 | 13500 | NaOH; 4.0 × 10⁻⁶<br>TMAH; 9.1 × 10⁻⁴ | DBSH; 8.8 × 10⁻⁵ | SAMDPC; 4.88 × 10⁻¹ | 40 |
| Ex. 8 | 13500 | NaOH; 4.0 × 10⁻⁶<br>TMAH; 9.1 × 10⁻⁴ | DBSH; 8.8 × 10⁻⁵ | SAMDPC; 4.88 × 10⁻¹ | 40 |

| | melt viscosity stability | Mw/Mn | acid value | bonded P: parts by weight | bonded P (ppm) |
|---|---|---|---|---|---|
| Ex. 1 | 0 | 2.2 | 0 | A1; 5.48 × 10⁻⁴ | 1 |
| C. Ex. 1 | 0 | 2.2 | 0 | A1; 5.48 × 10⁻⁴ | 1 |
| C. Ex. 2 | 0 | 2.2 | 0 | A2; 2.67 × 10⁻⁴ | 1 |
| Ex. 2 | 0 | 2.2 | 0 | A2; 1.79 × 10⁻⁴ | 0.7 |
| Ex. 3 | 0 | 2.2 | 0 | A3; 1.28 × 10⁻⁴ | 0.5 |
| C. Ex. 3 | 0 | 2.2 | 0 | 0 | 0 |
| Ex. 4 | 0 | 2.2 | 0 | A4; 7.21 × 10⁻⁴ | 2 |
| Ex. 5 | 0 | 2.2 | 0 | A5; 1.73 × 10⁻³ | 3.5 |
| C. Ex. 4 | 0 | 2.2 | 0 | A6; 1.51 × 10⁻³ | 3.9 |
| Ex. 6 | 0 | 2.2 | 0 | A1; 1.10 × 10⁻³ | 2 |
| Ex. 7 | 0 | 2.2 | 0 | A1; 1.10 × 10⁻³ | 2 |
| Ex. 8 | 0 | 2.2 | 0 | A2; 6.68 × 10⁻⁴ | 2.5 |

Ex. = Example
C. Ex. = Comparative Example

TABLE 2

| | viscosity average molecular weight | catalyst: parts by weight | deactivator: parts by weight | terminal capping agent: parts by weight | terminal OH |
|---|---|---|---|---|---|
| Ex. 9 | 13500 | NaOH; 4.0 × 10⁻⁶<br>TMAH; 9.1 × 10⁻⁴ | DBSH; 8.8 × 10⁻⁵ | SAMDPC; 4.88 × 10⁻¹ | 40 |
| Ex. 10 | 13500 | NaOH; 4.0 × 10⁻⁶<br>TMAH; 9.1 × 10⁻⁴ | DBSH; 8.8 × 10⁻⁵ | SAMDPC; 4.88 × 10⁻¹ | 40 |
| Ex. 11 | 13500 | NaOH; 4.0 × 10⁻⁶<br>TMAH; 9.1 × 10⁻⁴ | DBSH; 8.8 × 10⁻⁵ | SAMDPC; 4.88 × 10⁻¹ | 40 |
| Ex. 12 | 13500 | NaOH; 4.0 × 10⁻⁶<br>TMAH; 9.1 × 10⁻⁴ | DBSH; 8.8 × 10⁻⁵ | SAMDPC; 4.88 × 10⁻¹ | 40 |
| C. Ex. 5 | 13500 | NaOH; 4.0 × 10⁻⁶<br>TMAH; 9.1 × 10⁻⁴ | DBSH; 0 | SAMDPC; 4.88 × 10⁻¹ | 40 |
| Ex. 13 | 13500 | NaOH; 4.0 × 10⁻⁶<br>TMAH; 9.1 × 10⁻⁴ | DBSH; 8.8 × 10⁻⁵ | SAMDPC; 4.88 × 10⁻¹ | 40 |
| Ex. 14 | 13500 | NaOH; 4.0 × 10⁻⁶<br>TMAH; 9.1 × 10⁻⁴ | DBSH; 8.8 × 10⁻⁵ | SAMDPC; 2.44 × 10⁻¹ | 70 |
| C. Ex. 6 | 13500 | NaOH; 4.0 × 10⁻⁶<br>TMAH; 9.1 × 10⁻⁴ | DBSH; 8.8 × 10⁻⁵ | SAMDPC; 0 | 100 |
| Ex. 15 | 15000 | NaOH; 4.0 × 10⁻⁶<br>TMAH; 9.1 × 10⁻⁴ | DBSH; 8.8 × 10⁻⁵ | SAMDPC; 4.47 × 10⁻¹ | 40 |
| Ex. 16 | 22000 | NaOH; 4.0 × 10⁻⁶<br>TMAH; 9.1 × 10⁻⁴ | DBSH; 8.8 × 10⁻⁵ | SAMDPC; 3.25 × 10⁻¹ | 30 |
| Ex. 17 | 30000 | NaOH; 4.0 × 10⁻⁶<br>TMAH; 9.1 × 10⁻⁴ | DBSH; 8.8 × 10⁻⁵ | SAMDPC; 2.84 × 10⁻¹ | 20 |
| Ex. 18 | 13500 | NaOH; 4.0 × 10⁻⁶<br>TMAH; 9.1 × 10⁻⁴ | DBSH; 8.8 × 10⁻⁵ | SAMDPC; 6.50 × 10⁻¹ | 20 |
| Ex. 19 | 13500 | NaOH; 4.0 × 10⁻⁶<br>TMAH; 9.1 × 10⁻⁴ | DBSH; 8.8 × 10⁻⁵ | SAMDPC; 6.50 × 10⁻¹ | 20 |

| | melt viscosity stability | Mw/Mn | acid value | bonded P: parts by weight | bonded P (ppm) |
|---|---|---|---|---|---|
| Ex. 9 | 0 | 2.2 | 0 | A3; 2.55 × 10⁻⁴ | 1 |
| Ex. 10 | 0 | 2.2 | 0 | A3; 1.53 × 10⁻³ | 6 |
| Ex. 11 | 0 | 2.2 | 0 | A2; 8.02 × 10⁻⁴ | 3 |
| Ex. 12 | 0 | 2.2 | 0 | A1; 9.86 × 10⁻⁴ | 1.8 |
| C. Ex. 5 | 1.7 | 2.2 | 0 | A1; 9.86 × 10⁻⁴ | 1.8 |
| Ex. 13 | 0 | 2.2 | 0 | A1; 1.10 × 10⁻³ | 2 |
| Ex. 14 | 0 | 2.2 | 0 | A1; 1.10 × 10⁻³ | 2 |
| C. Ex. 6 | 0 | 2.2 | 0 | A1; 1.10 × 10⁻³ | 2 |
| Ex. 15 | 0 | 2.3 | 0 | A2; 2.68 × 10⁻⁴ | 1 |
| Ex. 16 | 0 | 2.5 | 0 | A2; 1.07 × 10⁻³ | 4 |
| Ex. 17 | 0 | 3.0 | 0 | A2; 2.14 × 10⁻³ | 8 |
| Ex. 18 | 0 | 2.2 | 0 | A4; 7.21 × 10⁻⁴ | 2 |
| Ex. 19 | 0 | 2.2 | 0 | A4; 7.21 × 10⁻⁴ | 2 |

Ex. = Example
C. Ex. = Comparative Example

TABLE 3

| | total P | free phosphorus (ppm) | bonded P: free P | free P (III): parts by weight | free P (III) (ppm) | free P (V): parts by weight | free P (V) (ppm) | P (III)/(V) |
|---|---|---|---|---|---|---|---|---|
| Ex. 1 | 6 | 5 | 1/5 | A1; 2.73 × 10$^{-4}$ | 0.5 | B1; 2.53 × 10$^{-3}$ | 4.5 | 1/9 |
| C. Ex. 1 | 5 | 4 | 1/4 | A1; 2.19 × 10$^{-3}$ | 4 | 0 | 0 | 0/10 |
| C. Ex. 2 | 5 | 4 | 1/4 | 0 | 0 | B1; 2.25 × 10$^{-3}$ | 4 | 10/0 |
| Ex. 2 | 5 | 3 | 0.7/3 | A2; 7.22 × 10$^{-4}$ | 2.7 | B2; 8.4 × 10$^{-5}$ | 0.3 | 9/1 |
| Ex. 3 | 5 | 5 | 1/10 | A3; 1.15 × 10$^{-3}$ | 4.5 | B3; 1.35 × 10$^{-4}$ | 0.5 | 9/1 |
| C. Ex. 3 | 5 | 5 | | A3; 7.67 × 10$^{-4}$ | 3 | B3; 5.38 × 10$^{-4}$ | 2 | 3/2 |
| Ex. 4 | 4 | 2 | 1/1 | A4; 6.49 × 10$^{-4}$ | 1.8 | B4; 7.18 × 10$^{-5}$ | 0.2 | 9/1 |
| Ex. 5 | 4 | 0.5 | 3.5/0.5 | A5; 2.22 × 1$^{-4}$ | 0.45 | B5; 2.60 × 10$^{-5}$ | 0.05 | 9/1 |
| C. Ex. 4 | 4 | 0.09 | 3.9/0.1 | A6; 3.5 × 10$^{-6}$ | 0.009 | B6; 3.36 × 10$^{-5}$ | 0.081 | 9/1 |
| Ex. 6 | 6 | 4 | 2/4 | A1; 5.48 × 10$^{-4}$ | 1 | B1; 1.68 × 10$^{-3}$ | 3 | 1/3 |
| Ex. 7 | 7 | 5 | 2/5 | A1; 1.64 × 10$^{-3}$ | 3 | B1; 1.12 × 10$^{-3}$ | 2 | 3/2 |
| Ex. 8 | 5 | 3.5 | 5/7 | A2; 8.29 × 10$^{-4}$ | 3.1 | B2; 1.12 × 10$^{-4}$ | 0.4 | 3.1/0.4 |

Ex. = Example
C. Ex. = Comparative Example

TABLE 4

| | total P | free phosphorus (ppm) | bonded P: free P | free P (III): parts by weight | free P (III) (ppm) | free P (V): parts by weight | free P (V) (ppm) | P (III)/(V) |
|---|---|---|---|---|---|---|---|---|
| Ex. 9 | 4 | 3 | 1/3 | A3; 2.56 × 10$^{-4}$ | 1 | B3; 5.38 × 10$^{-4}$ | 2 | 1/2 |
| Ex. 10 | 8 | 2 | 3/1 | A3; 3.83 × 10$^{-4}$ | 1.5 | B3; 1.35 × 10$^{-4}$ | 0.5 | 3/1 |
| Ex. 11 | 4 | 1 | 3/1 | A2; 1.61 × 10$^{-4}$ | 0.6 | B2; 1.12 × 10$^{-4}$ | 0.4 | 3/1 |
| Ex. 12 | | 0.7 | 1.8/0.7 | A1; 1.64 × 10$^{-4}$ | 0.3 | B1; 2.24 × 10$^{-4}$ | 0.4 | 3/4 |
| C. Ex. 5 | 2.5 | 0.7 | 1.8/0.7 | A1; 1.64 × 10$^{-4}$ | 0.3 | B1; 2.24 × 10$^{-4}$ | 0.4 | 3/4 |
| Ex. 13 | 5 | 3 | 1/2 | A1; 8.22 × 10$^{-4}$ | 1.5 | B1; 8.42 × 10$^{-4}$ | 1.5 | 1/1 |
| Ex. 14 | 5 | 3 | 1/2 | A1; 8.22 × 10$^{-4}$ | 1.5 | B1; 8.42 × 10$^{-4}$ | 1.5 | 1/1 |
| C. Ex. 6 | 5 | 3 | 1/2 | A1; 8.22 × 10$^{-4}$ | 1.5 | B1; 8.42 × 10$^{-4}$ | 1.5 | 1/1 |
| Ex. 15 | 5 | 4 | 1/4 | A2; 5.35 × 10$^{-4}$ | 2 | B25.61 × 10$^{-4}$ | 2 | 1/1 |
| Ex. 16 | 10 | 6 | 1/3 | A2; 8.02 × 10$^{-4}$ | 3 | B2; 8.43 × 10$^{-4}$ | 3 | 1/1 |
| Ex. 17 | 20 | 12 | 1/3 | A2; 1.61 × 10$^{-3}$ | 6 | B2; 1.68 × 10$^{-3}$ | 6 | 1/1 |
| Ex. 18 | 5 | 3 | 1/2 | A4; 5.41 × 10$^{-4}$ | 1.5 | B4; 5.38 × 10$^{-4}$ | 1.5 | 1/1 |
| Ex. 19 | 5 | 3 | 1/2 | A4; 5.41 × 10$^{-4}$ | 1.5 | B4; 5.38 × 10$^{-4}$ | 1.5 | 1/1 |

Ex. = Example
C. Ex. = Comparative Example

TABLE 5

| | fatty acid ester | phenol-based stabilizer | acid value | melt viscosity stability | overall judgment | residence stability; ΔE | releasability | mold stains |
|---|---|---|---|---|---|---|---|---|
| Ex. 1 | (R2); 200 ppm | 0 | 0 | 0 | ○ | 2.3 | ○ | ○ |
| C. Ex. 1 | (R2); 200 ppm | 0 | 0 | 0 | × | 2.8 | × | × |
| C. Ex. 2 | (R2); 200 ppm | 0 | 0 | 0 | × | 2.9 | × | × |
| Ex. 2 | (R2); 200 ppm | 0 | 0 | 0 | ○ | 2.2 | ○ | ○ |
| Ex. 3 | (R2); 200 ppm | 0 | 0 | 0 | ○ | 2.4 | ○ | ○ |
| C. Ex. 3 | (R2); 200 ppm | 0 | 0 | 0 | × | 3.5 | ○ | ○ |
| Ex. 4 | (R3); 100 ppm | 0 | 0 | 0 | ○ | 1.8 | ○ | ○ |
| Ex. 5 | (R3); 100 ppm | 0 | 0 | 0 | ○ | 2.7 | ○ | ○ |
| C. Ex. 4 | (R3); 100 ppm | 0 | 0 | 0 | × | 3.7 | × | × |
| Ex. 6 | (R1); 200 ppm | 0 | 0 | 0 | ◎ | 1.7 | ◎ | ◎ |
| Ex. 7 | (R1); 200 ppm | 0 | 0 | 0 | ◎ | 1.7 | ◎ | ◎ |
| Ex. 8 | (R1); 200 ppm | 0 | 0 | 0 | ◎ | 1.5 | ◎ | ◎ |

Ex. = Example
C. Ex. = Comparative Example

TABLE 6

|  | fatty acid ester | phenol-based stabilizer | acid value | melt viscosity stability | overall judgment | residence stability; ΔE | releasability | mold stains |
|---|---|---|---|---|---|---|---|---|
| Ex. 9 | (R1); 200 ppm | 0 | 0 | 0 | ⊚ | 1.8 | ⊚ | ⊚ |
| Ex. 10 | (R1); 200 ppm | 0 | 0 | 0 | ⊚ | 1.6 | ⊚ | ⊚ |
| Ex. 11 | (R1); 200 ppm | 0 | 0 | 0 | ⊚ | 1.8 | ⊚ | ⊚ |
| Ex. 12 | (R1); 200 ppm | 0 | 0 | 0 | ⊚ | 1.9 | ⊚ | ⊚ |
| C. Ex. 5 | (R1); 200 ppm | 0 | 0 | 0.8 | × | 3.1 | × | × |
| Ex. 13 | (R4); 300 ppm | 0 | 0 | 0 | ⊚ | 1.7 | ⊚ | ⊚ |
| Ex. 14 | (R4); 300 ppm | 0 | 0 | 0 | ○ | 2.2 | ○ | ⊚ |
| C. Ex. 6 | (R4); 300 ppm | 0 | 0 | 0 | × | 3.6 | × | ○ |
| Ex. 15 | (R5); 200 ppm | C1; 100 C2; 200 | 0 | 0 | ⊚ | 1.9 | ⊚ | ⊚ |
| Ex. 16 | (R5); 200 ppm | C1; 100 C2; 200 | 0 | 0 | ⊚ | 1.8 | ⊚ | ⊚ |
| Ex. 17 | (R5); 200 ppm | C1; 100 C2; 200 | 0 | 0 | ○ | 2.2 | ⊚ | ⊚ |
| Ex. 18 | (R1); 200 ppm | 0 | 0 | 0 | ⊚ | 1.8 | ⊚ | ⊚ |
| Ex. 19 | (R1); 200 ppm | 0 | 3 | 0 | ○ | 2.4 | ○ | ○ |

Ex. = Example
C. Ex. = Comparative Example

Abbreviations in the above Tables stand for the following substances.

P(III) compounds; (A1); tris(2,4-di-t-butylphenyl) phosphite, (A2); bis(2,6-di-t-butyl-4-methyl) pentaerythrityl diphosphite, (A3); bis(2,4-di-t-butylphenyl)pentaerythrityl diphosphite, (A4); bis(2,4-dicumylphenyl)pentaerythrityl diphosphite, (A5); 2,2-methylenebis(4,6-di-t-butylphenyl)octylphosphite, (A6); bis(2,4-di-t-butylphenyl)acid pohsophite P(V) compounds; (B1); tris(2,4-di-t-butylphenyl)phsophate, (B2); bis(2,6-di-t-butyl-4-methyl)pentaerythrityl diphosphate, (B3); bis(2,4-di-t-butylphenyl) pentaerythrityl diphosphate, (B4); bis(2,4-dicumylphenyl)pentaerythrityl diphosphate fatty acid esters; (R1); glycerine monostearate, (R2); glycerine distearate, (R3); glycerine tristearate, (R4); pentaerythritol monostearate, (R5); pentaerythritol tetrastearate steric hindrance phenol-based stabilizers; (C1); 2-t-butyl-6-(3-t-butyl-2-hydroxy-5-methylbenzyl)-4-methylphenyl acrylalte, (C2); pentaerythrityl-tetrakis[3-(3,5-di-t-butyl-4-hydroxyphenyl)propionate]

What is claimed is:

1. An aromatic polycarbonate composition comprising:
(A) 100 parts by weight of an aromatic polycarbonate
   (1) which comprises mainly a recurring unit represented by the following formula (1):

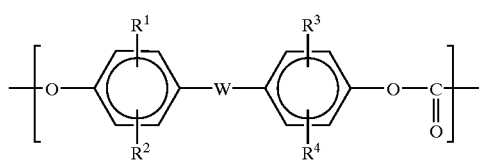

(1)

wherein $R^1$, $R^2$, $R^3$ and $R^4$ are each independently a hydrogen atom, alkyl group having 1 to 10 carbon atoms, aryl group having 6 to 10 carbon atoms or aralkyl group having 7 to 10 carbon atoms, and W is an alkylene group having 1 to 10 carbon atoms, alkylidene group having 2 to 10 carbon atoms, cycloalkylene group having 6 to 10 carbon atoms, cycloalkylidene group having 6 to 10 carbon atoms, alkylene-arylene-alkylene group having 8 to 15 carbon atoms, oxygen atom, sulfur atom, sulfoxide group or sulfone group, (2) which has a viscosity average molecular weight of 12,000 to 100,000,
   (3) which has a molecular terminal OH group concentration of 3 to 80 equivalents/ton of a polycarbonate resin (to be referred to as "eq/ton" hereinafter), and
   (4) which contains bonded phosphorus atoms, which are phosphorus atoms bonded topolycarbonate chains, in an amount of 0.05 to 65 ppm; and
(B) a combination of free P(III) compound and free P(V) compound which satisfy the following expression:

$$0.1 \leq P(V) \leq 3 \times P(III)^{0.7} + 2 \times (OH)^{0.2}$$

wherein P(V) is the weight-based content (ppm) of the P(V) compound in terms of phosphorus atoms, P(III) is the weight-based content (ppm) of the P(III) compound in terms of phosphorus atoms, and OH is the concentration (eq/ton) of molecular terminal OH groups, and which total $5 \times 10^{-6}$ to $6.5 \times 10^{-3}$ parts by weight in terms of phosphorus atoms; and having (C) a melt viscosity change rate at 300° C. of 0.5% or less.

2. The aromatic polycarbonate composition of claim 1, wherein the free P(III) compound and the free P(V) compound satisfy the following expression:

$$0.1 \times P(III)^{0.5} + 0.03(OH)^{0.3} \leq P(V) \leq 3 \times P(III)^{0.5} + 2 \times (OH)^{0.2}$$

wherein P(III), P(V) and (OH) are as defined hereinabove.

3. The aromatic polycarbonate composition of claim 1 which contains the bonded phosphorus atoms and the phosphorus atoms of the free phosphorus compounds in a total amount of $1.0 \times 10^{-5}$ to $8.0 \times 10^{-3}$ part by weight based on 100 parts by weight of the aromatic polycarbonate.

4. The aromatic polycarbonate composition of claim 1, wherein the ratio of the bonded phosphorus atoms to the phosphorus atoms of the free phosphorus compounds is in the range of 1:4 to 4:1.

5. The aromatic polycarbonate composition of claim 1 which contains the free phosphorus compounds in such amounts that satisfy the following expression (2):

$$0.1 \times (P(III))^{0.5} + 0.05 \times (OH)^{0.3} \leq P(V) \leq 3 \times (P(III))^{0.5} + 1 \times (OH)^{0.2} \quad (2)$$

wherein P(V) is the weight-based content (ppm) of the P(V) compound in terms of phosphorus atoms, P(III) is the weight-based content (ppm) of the P(III) compound in terms of phosphorus atoms, and OH is the concentration (equivalents/ton) of molecular terminal OH groups.

6. The aromatic polycarbonate composition of claim 1, wherein the ratio (Mw/Mn) of the weight average molecular weight (Mw) to the number average molecular weight (Mn) of the aromatic polycarbonate (A) is 2.0 to 3.6.

7. The aromatic polycarbonate composition of claim 1, wherein the free P(III) compound is a phosphorous acid ester and the free P(V) compound is a phosphoric acid ester.

8. The aromatic polycarbonate composition of claim 1, wherein the free P(III) compound is a phosphorous acid triester represented by the following formula:

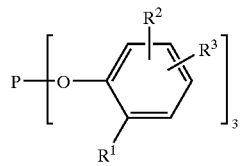

wherein $R^1$ is a t-butyl group, t-amyl group or cumyl group, and $R^2$ and $R^3$ are each independently a hydrogen atom, t-butyl group, t-amyl group or cumyl group.

9. The aromatic polycarbonate composition of claim 1, wherein the free P(V) compound is a phosphoric acid triester represented by the following formula:

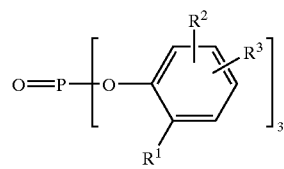

wherein $R^1$ is a t-butyl group, t-amyl group or cumyl group, and $R^2$ and $R^3$ are each independently a hydrogen atom, t-butyl group, t-amyl group or cumyl group.

10. The aromatic polycarbonate composition of claim 1, wherein the free P(III) compound and the free P(V) compound have the same ester moiety skeleton.

11. The aromatic polycarbonate composition of claim 1, wherein the acid value of the aromatic polycarbonate (A) is 0 to 2 eq/ton.

12. The aromatic polycarbonate composition of claim 1, wherein some of the molecular terminal OH groups of the aromatic polycarbonate (A) are capped by a salicylic acid ester.

13. The aromatic polycarbonate composition of claim 1 which contains an alkali metal compound in an amount of 10 to 800 ppb in terms of an alkali metal.

14. Amended) The aromatic polycarbonate composition of claim 1, wherein the aromatic polycarbonate (A) is produced by melt polycondensing an aromatic dihydroxy compound and a carbonic acid diester in the presence of an ester exchange catalyst which contains (a) a basic nitrogen compound and/or a basic phosphorus compound and (b) an alkali metal compound or alkali earth metal compound.

15. The aromatic polycarbonate composition of claim 14, wherein the aromatic polycarbonate (A) is produced by using a melt viscosity stabilizer represented by the following formula (3):

wherein $A^1$ is a hydrocarbon group having 1 to 20 carbon atoms which may have a substituent, $X^1$ is an ammonium cation, phosphonium cation or alkyl group having 1 to 10 carbon atoms, and m is an integer of 1 to 4, in an amount of 0.7 to 100 equivalents based on 1 equivalent of the alkali metal compound of the ester exchange catalyst.

16. An aromatic polycarbonate composition which further contains 0.01 to 0.5 part by weight of a higher fatty acid ester based on 100 parts by weight of the aromatic polycarbonate composition of claim 1.

17. The aromatic polycarbonate composition of claim 16, wherein the higher fatty acid ester is a partial ester of a higher aliphatic carboxylic acid and a polyhydric alcohol.

18. The aromatic polycarbonate composition of claim 17, wherein the higher aliphatic carboxylic acid is a saturated aliphatic monocarboxylic acid having 12 to 24 carbon atoms and the polyhydric alcohol is glycerin.

19. An aromatic polycarbonate composition which contains 0.001 to 10 parts by weight of a steric hindrance phenol-based stabilizer based on 100 parts by weight of the aromatic polycarbonate composition of claim 1.

20. The aromatic polycarbonate composition of claim 1 which has an acid value of 0 to 2 eq/ton.

21. The aromatic polycarbonate composition of claim 1 which has a melt viscosity change rate at 300° C. of 0.5% or less.

22. A molded article of the aromatic polycarbonate composition of claim 1, 16 or 19.

23. The molded article of claim 22 which is a disk substrate.

* * * * *